United States Patent
Sugihara et al.

(10) Patent No.: US 10,040,933 B2
(45) Date of Patent: Aug. 7, 2018

(54) POLYMERIZABLE COMPOSITION FOR STEREOLITHOGRAPHY

(71) Applicant: JNC CORPORATION, Tokyo (JP)

(72) Inventors: Katsuyuki Sugihara, Chiba (JP); Kuniaki Arai, Chiba (JP)

(73) Assignee: JNC CORPORATION, Tokyo (JP)

( * ) Notice: Subject to any disclaimer, the term of this patent is extended or adjusted under 35 U.S.C. 154(b) by 29 days.

(21) Appl. No.: 14/431,305

(22) PCT Filed: Sep. 27, 2013

(86) PCT No.: PCT/JP2013/076250
§ 371 (c)(1),
(2) Date: Mar. 26, 2015

(87) PCT Pub. No.: WO2014/051046
PCT Pub. Date: Apr. 3, 2014

(65) Prior Publication Data
US 2015/0232654 A1    Aug. 20, 2015

(30) Foreign Application Priority Data

Sep. 27, 2012 (JP) ................. 2012-214200

(51) Int. Cl.
*C08L 33/14* (2006.01)
*C08K 5/42* (2006.01)

(52) U.S. Cl.
CPC ............... *C08L 33/14* (2013.01); *C08K 5/42* (2013.01); *C08L 2205/025* (2013.01)

(58) Field of Classification Search
CPC ...... C08K 33/04; C08L 5/42; C08L 2205/025
See application file for complete search history.

(56) References Cited

U.S. PATENT DOCUMENTS

| | | | |
|---|---|---|---|
| 6,066,684 A | 5/2000 | Fujimoto et al. | |
| 7,368,484 B2 * | 5/2008 | Levy | B29C 67/24 430/269 |
| 2003/0107158 A1 * | 6/2003 | Levy | B29C 67/0055 264/494 |

FOREIGN PATENT DOCUMENTS

| | | |
|---|---|---|
| CN | 101092469 | 12/2007 |
| JP | 2000-290328 | 10/2000 |
| JP | 2003-226724 | 8/2003 |
| JP | 2007-106830 | 4/2007 |
| JP | 2008-189782 | 8/2008 |
| JP | 2008-248026 | 10/2008 |
| JP | 2010-155926 | 7/2010 |

OTHER PUBLICATIONS

"International Search Report (Form PCT/ISA/210)", dated Jan. 7, 2014, pp. 1-4.
"Search Report of European Counterpart Application", dated Mar. 16, 2016, p. 1-p. 7.
English Translation of "Written Opinion of International Searching Authority (Form PCT/ISA/237)", dated Jan. 7, 2014, pp. 1-3.
"Office Action of Taiwan Counterpart Application" with English translation thereof, dated Feb. 2, 2017, p. 1-p. 10.

* cited by examiner

*Primary Examiner* — Sanza Mcclendon
(74) *Attorney, Agent, or Firm* — JCIPRNET

(57) ABSTRACT

Provided is a highly versatile polymerizable composition that allows the fabrication equipment to be washed easily with water, allows the fabricated object to be removed easily from the support, and allows easy curing by application of light rays of 400 nm or higher, in optical 3D fabrication by lamination fabrication. A photopolymerizable composition for stereolithography containing a water-soluble radical polymerizable compound (A) represented by formula (1), a photopolymerization initiator (B) that generates radicals upon application of light rays of a wavelength of 400 nm or higher, and an ionic surfactant (C). In formula (1), $R^1$ is an organic group of valence a, a is an integer of 2 or higher, and $R^2$ is hydrogen or an alkyl having 1-6 carbon atoms.

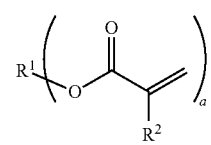

(1)

8 Claims, No Drawings

POLYMERIZABLE COMPOSITION FOR STEREOLITHOGRAPHY

CROSS-REFERENCE TO RELATED APPLICATION

This application is a 371 application of International PCT application serial no. PCT/JP2013/076250, filed on Sep. 27, 2013, which claims the priority benefit of Japan application no. 2012-214200, filed on Sep. 27, 2012. The entirety of each of the above-mentioned patent applications is hereby incorporated by reference herein and made a part of this specification.

TECHNICAL FIELD

The present invention relates to a radically polymerizable resin composition for fabrication preferable for use upon manufacturing a 3D fabricated object by an optical 3D fabrication method, and a 3D fabricated object manufactured using the resin composition.

BACKGROUND ART

A proposal has been recently made on an optical 3D fabrication method referred to as a lamination fabrication method, as a method for manufacturing a 3D fabricated object, in which a 3D fabricated object having a desired shape is manufactured by preparing original data obtained by slicing 3-dimensional CAD data of a product to seeming stack thin plates, and repeating a plurality of times a step of irradiating with light a thin film formed of a photocurable-resin composition using a radically polymerizable compound and a cationically polymerizable compound to cure the thin film. As equipment for manufacturing such a photofabricated object, a further inexpensive equipment puts on the market, and expansion is expected, for example, in an industrial application such as manufacture of a trial product, and also an application in which such equipment can be used in an ordinary home.

For example, in such a lamination fabrication method, moisture resistance or productivity of the fabricated object can be improved by using a specific radically polymerizable compound (Patent literature No. 1). However, such a specific radically polymerizable compound is significantly low in water solubility, and therefore use of an organic solvent such as acetone and isopropyl alcohol is needed for washing fabrication equipment.

Patent literature No. 2 describes an art in which, in order to achieve low viscosity, fast curability and a decrease in curing shrinkage, a water-soluble ethylenic unsaturated compound having at least one radically polymerizable ethylenic unsaturated bond in a molecule is formulated in a radically polymerizable resin composition to further add water in an amount of a saturated moisture content or less thereto.

REFERENCE LIST

Patent Literature

Patent literature No. 1: JP 2008-189782 A.
Patent literature No. 2: JP 2003-226724 A.

SUMMARY OF INVENTION

Technical Problem

In a composition described in Patent literature No. 1, a polymerizable composition used cannot be washed out with water. Therefore, for example, when the composition is handled in an ordinary home, disposal of a waste fluid has been significantly difficult. Moreover, in a composition described in Examples in Patent literature No. 2, adhesion with a support formed of a fabricated object and a fluorocarbon resin is too high, and therefore when the fabricated object is removed from the support, the support has been broken in several cases.

Under a situation described above, an object of the invention is to provide a highly versatile polymerizable composition that allows easy washing of fabrication equipment with water, allows easy removal of the fabricated object from the support, and allows easy curing by irradiation with light rays having 400 nanometers or more, in optical 3D fabrication by a lamination fabrication method.

Solution to Problem

The inventors have found that a photopolymerizable composition containing specific water-soluble radically polymerizable compound (A), photopolymerization initiator (B) and ionic surfactant (C) is useful as a highly versatile polymerizable composition that allows easy washing of fabrication equipment with water, allows easy removal of a fabricated object from a support, and allows easy curing by irradiation with light rays having 400 nanometers or more, in optical 3D fabrication by a lamination fabrication method, and thus have completed the invention based on such a finding.

More specifically, the invention includes items described below.

Item 1. A photopolymerizable composition for stereolithography, containing water-soluble radically polymerizable compound (A) represented by formula (1), photopolymerization initiator (B) that generates radicals by irradiation with light rays having a wavelength of 400 nanometers or more, and ionic surfactant (C):

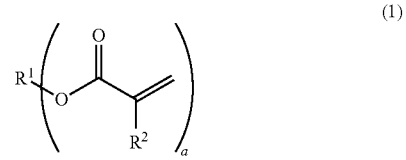

(1)

wherein, in formula (1), $R^1$ is an a-valent organic group, a is an integer of 2 or more, and $R^2$ is hydrogen or alkyl having 1 to 6 carbons.

Item 2. The photopolymerizable composition according to item 1, wherein $R^1$ of radically polymerizable compound (A) is a compound having structure represented by formula (2):

(2)

wherein, in formula (2), $R^3$ is alkylene having 2 to 5 carbons, and b is an integer of 1 or more.

Item 3. The photopolymerizable composition according to item 1 or 2, wherein photopolymerization initiator (B) is one or more selected from the group of an α-aminoalkylphenon-based compound and an acylphosphine oxide-based compound.

Item 4. The photopolymerizable composition according to any one of items 1 to 3, wherein photopolymerization initiator (B) is one or more selected from an acylphosphine oxide-based compound.

Item 5. The photopolymerizable composition according to any one of items 1 to 4, wherein ionic surfactant (C) is one or more selected from the group of alkylbenzene sulfonate and polyoxyethylene alkyl ether sulfuric ester salt.

Item 6. The photopolymerizable composition according to any one of items 1 to 5, wherein ionic surfactant (C) is alkylbenzene sulfonate.

Item 7. The photopolymerizable composition according to any one of items 1 to 6, further containing water-soluble radically polymerizable compound (D) having structure represented by formula (3), (4) or (5):

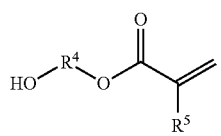

(3)

wherein, in formula (3), $R^4$ is a divalent organic group, and $R^5$ is hydrogen or alkyl having 1 to 6 carbons:

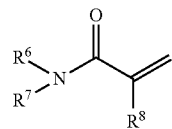

(4)

wherein, in formula (4), $R^6$ is hydrogen or a monovalent organic group, $R^7$ is a monovalent organic group, and $R^8$ is hydrogen or alkyl having 1 to 6 carbons:

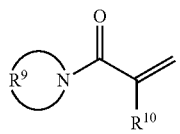

(5)

wherein, in formula (5), $R^9$ is a divalent organic group, and $R^{10}$ is hydrogen or alkyl having 1 to 6 carbons.

Item 8. A photofabricated object, obtained by curing the photopolymerizable composition according to any one of items 1 to 7.

Advantageous Effects of Invention

A photopolymerizable composition of the invention can be easily washed out with water, and a fabricated object obtained from the composition has high water resistance, and therefore the fabricated object and fabrication equipment can be easily washed with water.

Moreover, the fabricated object obtained from the composition can be easily removed from a support.

Further, the composition can be easily cured by irradiation with light rays having 400 nanometers or more.

Therefore, the composition allows production of the fabricated object by a highly versatile lamination fabrication method that can be easily applied even in an ordinary home.

DESCRIPTION OF EMBODIMENTS

1. Photopolymerizable Composition of the Invention

A photopolymerizable composition of the invention contains water-soluble radically polymerizable compound (A), photopolymerization initiator (B) and ionic surfactant (C). Moreover, the photopolymerizable composition of the invention may be colorless or colored.

"(Meth)acrylate" herein is used to represent both acrylate and methacrylate or either the acrylate or the methacrylate. Moreover, "(Meth)acryloyl group" herein is used to represent both an acryloyl group and a methacryloyl group or either the acryloyl group or the methacryloyl group.

Each component described above will be described below.

1.1. Water-Soluble Radically Polymerizable Compound (A)

Water-soluble radically polymerizable compound (A) (hereinafter, also referred to as "compound (A)") is represented by formula (1).

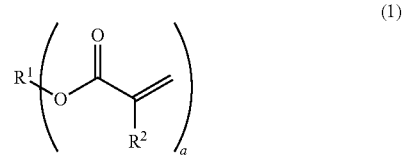

(1)

In formula (1), $R^1$ is an a-valent organic group, a is an integer of 2 or more. Moreover, $R^2$ is hydrogen or alkyl having 1 to 6 carbons.

Here, specific examples of preferred compound (A) include a compound in which $R^1$ contains a hetero atom. Specific examples of further preferred compound (A) include a compound in which $R^1$ is a compound having structure represented by formula (2) described below.

(2)

In formula (2), $R^3$ is alkylene having 2 to 5 carbons, and b is an integer of 1 or more.

Water solubility herein means that maximum weight at which uniform mixing is allowed with 100 grams of water at 25° C. is 0.5 gram or more.

A content of water-soluble radically polymerizable compound (A) contained in the photopolymerizable composition herein is preferably 3 to 96%, when the total weight of the composition is taken as 100%, because an uncured photopolymerizable composition can be easily washed out with water, further preferably, 5 to 96%, and still further preferably, 10 to 96%.

Specific examples of the compound of water-soluble radically polymerizable compound (A) represented by formula (1) include polyethyleneglycol diacrylate, tripropyleneglycol diacrylate, NK Ester A-GLY-9E and NK Ester A-GLY-20E (trade names, Shin-Nakamura Chemical Co., Ltd.), and BLEMMER DA700AU and ditto DA800AU (trade names, NOF Corporation).

1.2. Photopolymerization Initiator (B)

The photopolymerizable composition of the invention contains photopolymerization initiator (B). Photopolymerization initiator (B) is not particularly limited, if photopolymerization initiator (B) includes a compound that can generate radicals by irradiation with light rays having a wavelength of 400 nanometers or more.

Specific examples of the compound that can generate radicals by irradiation with light rays having a wavelength of 400 nanometers or more include 2-hydroxy-1-{4-[4-(2-hydroxy-2-methyl-propionyl)-benzyl]phenyl}-2-methyl-1-propanone, 2-(dimethylamino)-1-(4-morpholinophenyl)-2-benzyl-1-butanone, 2-(dimethylamino)-2-[(4-methylphenyl)methyl]-1-[4-(4-morpholinyl)phenyl]-1-butanone, bis(2,4,6-trimethylbenzoyl)-phenylphosphineoxide, 2,4,6-trimethylbenzoyl-diphenyl-phosphineoxide, bis($\eta^5$-2,4-cyclopentadiene-1-yl)-bis(2,6-difluoro-3-(1H-pyrrole-1-yl-phenyl)titanium and 1-[4-(phenylthio)phenyl]-1,2-octanedione-2-(O-benzoyloxime)].

Above all, an α-aminoalkylphenon-based photopolymerization initiator and an acylphosphine oxide-based photopolymerization initiator are preferred due to satisfactory curability of the photopolymerizable compound, and an acylphosphine oxide-based photopolymerization initiator is further preferred due to further satisfactory water washability of the composition.

Photopolymerization initiator (B) may be in one kind or a mixture in two or more kinds.

A content of photopolymerization initiator (B) is preferably 1 to 25% by weight, based on a sum total of the radically polymerizable compound contained in the composition, due to excellent photocurability and high water washability of an uncured composition, further preferably, 3 to 20% by weight based thereon, and still further preferably, 5 to 15% by weight based thereon.

1.3. Ionic Surfactant (C)

The photopolymerizable composition of the invention contains ionic surfactant (C). Ionic surfactant (C) is a compound that can enhance mold releasability of the fabricated object obtained from the composition of the invention. Ionic surfactant (C) is preferably a compound that causes no decrease in water washability, curability or the like of the composition of the invention, and preferably a compound that causes no decrease in water resistance or the like of the fabricated object obtained from the composition.

Ionic surfactant (C) described above is not particularly limited as long as the characteristics described above are satisfied, but polyoxyethylene alkyl ether sulfuric ester salt, alkylbenzene sulfonate, alkyl diphenyl ether disulfonate or alkenyl succinate is preferred. Above all, a polyoxyethylene alkyl ether sulfuric ester salt and alkylbenzene sulfonate are preferred due to excellent compatibility with other components in the composition, and alkylbenzene sulfonate is further preferred due to satisfactory water washability of the composition.

Ionic surfactant (C) used for the photopolymerizable composition of the invention may be in one kind or a mixture in two or more kinds.

Moreover, a content of ionic surfactant (C) is preferably 0.05 to 5%, based on the total weight of the composition is taken as 100%, due to excellent mold releasability from the support, further preferably, 0.1 to 5% based thereon, and still further preferably, 0.5 to 5% based thereon.

1.4. Water-Soluble Radically Polymerizable Compound (D) Other than (A)

The composition of the invention may contain water-soluble radically polymerizable compound (D) other than (A).

Water-soluble radically polymerizable compound (D) other than (A) is not particularly limited, if water-soluble radically polymerizable compound (D) includes a water-soluble radically polymerizable compound having structure represented by formula (3), (4) or (5).

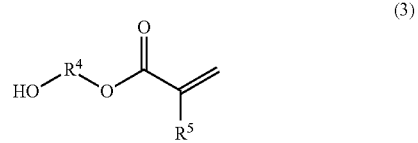

In formula (3), $R^4$ is a divalent organic group, and $R^5$ is hydrogen or alkyl having 1 to 6 carbons.

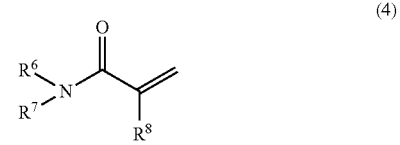

In formula (4), $R^6$ is hydrogen or a monovalent organic group, $R^7$ is a monovalent organic group, and $R^8$ is hydrogen or alkyl having 1 to 6 carbons.

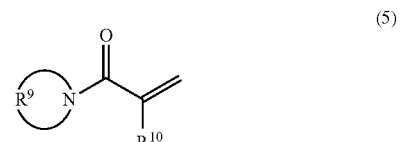

In formula (5), $R^9$ is a divalent organic group, and $R^{10}$ is hydrogen or alkyl having 1 to 6 carbons.

Specific examples of the compound of water-soluble radically polymerizable compound (D) other than (A) include a compound described below.

Specific examples of the compound represented by formula (3) include 2-hydroxyethyl (meth)acrylate, 2-hydroxypropyl (meth)acrylate, 2-hydroxybutyl (meth)acrylate, 4-hydroxybutyl (meth)acrylate, 1,4-cyclohexanedimethanol mono(meth)acrylate and polyoxyethylene monoacrylate. Specific examples of the compound represented by formula (4) include N-isopropylacrylamide, N,N-dimethyl (meth)acrylamide, N,N-dimethylaminoethyl (meth)acrylamide, N,N-diethyl l(meth)acrylamide, N,N-diethylaminoethyl (meth)acrylamide and N,N-dimethylaminopropyl (meth)acrylamide. Specific examples of the compound represented by formula (5) include (meth)acryloylmorpholine.

Water-soluble radically polymerizable compound (D) of the invention is appropriately used in order to improve water resistance of a photofabricated object obtained from the photopolymerizable composition.

1.5. Polymerization Inhibitor

The photopolymerizable composition of the invention may contain a polymerization inhibitor in order to improve storage stability without departing from the scope of the invention. Specific examples of the polymerization inhibitor include 4-methoxyphenol, hydroquinone and phenothiazine. Above all, phenothiazine is preferred due to a small increase in viscosity even under prolonged storage.

The polymerization inhibitor used in the photopolymerizable composition of the invention may be in one kind or a mixture in two or more kinds.

A content of the polymerization inhibitor is preferably 0.01 to 1% by weight, based on the photopolymerizable compound contained in the photopolymerizable composition, due to a small increase in viscosity even under prolonged storage, and in consideration of a balance with photocurability, further preferably, 0.01 to 0.5% by weight based thereon, and still further preferably, 0.01 to 0.2% by weight based thereon.

1.6. Other Additives

Specific examples of other additives that may be contained in the photopolymerizable composition of the invention include a plasticizer, an antioxidant, an ultraviolet light absorber, an antistatic agent, a flame retardant, a flame retardant aid, a filler, a pigment and a dye, but is not particularly limited thereto, if such an additive is uniformly mixed with any other component, without departing from the scope of the invention.

1.7. Method for Preparing Photopolymerizable Composition of the Invention

The photopolymerizable composition of the invention can be prepared by mixing each component used as a raw material according to a known method.

In particular, the photopolymerizable composition of the invention is preferably prepared by mixing components (A) to (D) described above, and when necessary, any other component, and filtering the resulting mixture to deaerate the mixture. The thus prepared photopolymerizable composition of the invention is excellent in printability. For the filtering described above, a membrane filter made of a fluorocarbon resin is used, for example.

1.8. Storage of Photopolymerizable Composition of the Invention

When the photopolymerizable composition of the invention is stored at 5 to 25° C., a change in viscosity during storage is small, and storage stability is satisfactory.

2. Formation of Photofabricated Object

The photofabricated object of the invention is obtained by using the photopolymerizable composition of the invention and irradiating the composition with light such as ultraviolet light and visible light rays to cure the composition according to a known stereolithography method.

An amount of light (exposure amount) when the composition is irradiated with light rays, although the amount depends on a formulation of the photopolymerizable composition, is preferably 10 to 1,000 mJ/cm$^2$, further preferably, 10 to 500 mJ/cm$^2$, and still further preferably, 10 to 300 mJ/cm$^2$ in measurement using UV Intensity Meter UIT-201 mounted with detector UVD-405PD made by USHIO Inc. Moreover, a wavelength of light rays for irradiation is preferably 400 to 550 nanometers, and further preferably, 400 to 450 nanometers.

In addition, equipment is not particularly limited, if the equipment is mounted with a light source such as a high pressure mercury lamp, an ultrahigh pressure mercury lamp, a metal halide lamp, a halogen lamp and a xenon lamp to irradiate the composition with light rays having a wavelength of 400 nanometers or more.

Upon optically performing 3D fabrication using the photopolymerizable composition of the invention, any optical 3D fabrication equipment that has been known so far can be used. Specific examples of typified optical 3D fabrication equipment that can be preferably applied include equipment in which a finally targeted 3D fabricated object is obtained by repeating lamination operation of sinking a liftable support by one layer of sliced 3-dimensional CAD data into a vessel filled with the photopolymerizable composition of the invention, and selectively irradiating the composition with the light rays from above to form a cured layer, subsequently, sinking the support by one layer of next sliced 3-dimensional CAD data thereinto and irradiating the composition with the light rays in a similar manner to newly form a cured layer continuous with the above cured layer, and equipment in which a 3D fabricated object is obtained by irradiating the composition with the light rays from below, reversely to the above equipment, and pulling up the support by each layer.

Moreover, a material of the support is not particularly limited. Specific examples include glass, a fluorocarbon resin, a silicone resin and metal. The photofabricated object prepared using the photopolymerizable composition of the invention can be easily removed from the supports.

In the manner described above, the photofabricated object can be prepared using the photopolymerizable composition of the invention, and the uncured photopolymerizable composition can be easily washed out with water.

EXAMPLES

The invention will be further described below by way of Examples, but the invention is not limited by the Examples. Moreover, a photopolymerizable composition obtained in Examples or Comparative Examples below may be occasionally simply referred to as a composition. More specifically, for example, photopolymerizable composition 1 may be occasionally referred to as composition 1.

Example 1

As water-soluble radically polymerizable compound (A), NK Ester A-GLY-9E (trade name, Shin-Nakamura Chemical Co., Ltd., hereinafter, abbreviated as A-GLY-9E), as photopolymerization initiator (B), Lucirin TPO (trade name, BASF Japan Ltd., hereinafter, abbreviated as TPO) being 2,4,6-trimethylbenzoyl-diphenyl-phosphineoxide, and as ionic surfactant (C), NEOPELEX G-15 (trade name, Kao Corporation, hereinafter, abbreviated as G-15) being sodium dodecyl benzene sulfonate were mixed and dissolved with each other at a formulation described below, and then the resulting mixture was filtered with a membrane filter (5 μm) made of PTFE to prepare photopolymerizable composition 1.

| | |
|---|---|
| (A) A-GLY-9E | 8.00 g |
| (B) TPO | 0.40 g |
| (C) G-15 | 0.084 g |

As a result of measuring a viscosity (at 25° C.) of photopolymerizable composition 1 using a cone-plate (E type) viscometer (TV-22, made by Toki Sangyo Co., Ltd., the same, hereinafter), the viscosity was 97 mPa·s.

Example 2

Photopolymerizable composition 2 was prepared in a manner similar to Example 1 except that NK Ester A-GLY-20E (trade name, Shin-Nakamura Chemical Co., Ltd., hereinafter, abbreviated as A-GLY-20E) was used as water-soluble radically polymerizable compound (A) and a formulation ratio described below was applied.

| (A) A-GLY-20E | 8.00 g |
| (B) TPO | 0.40 g |
| (C) G-15 | 0.084 g |

As a result of measuring a viscosity (at 25° C.) of photopolymerizable composition 2 using a cone-plate (E type) viscometer, the viscosity was 213 mPa·s.

Example 3

Photopolymerizable composition 3 was prepared in a manner similar to Example 1 except that 4HBA (trade name, Nippon Kasei Chemical Co., Ltd., hereinafter, abbreviated as 4HBA) being 4-hydroxybutyl acrylate was used as water-soluble radically polymerizable compound (D) and a formulation ration described below was applied.

| (A) A-GLY-20E | 5.00 g |
| (B) TPO | 0.40 g |
| (C) G-15 | 0.084 g |
| (D) 4HBA | 3.00 g |

As a result of measuring a viscosity (at 25° C.) of photopolymerizable composition 3 using a cone-plate (E type) viscometer, the viscosity was 28 mPa·s.

Example 4

Photopolymerizable composition 4 was prepared in a manner similar to Example 1 except that DEAA (trade name, KOHJIN Co., Ltd., hereinafter, abbreviated as DEAA) being N,N-diethylacrylamide was used as water-soluble radically polymerizable compound (D) and a formulation ratio described below was applied.

| (A) A-GLY-9E | 6.00 g |
| (B) TPO | 0.40 g |
| (C) G-15 | 0.084 g |
| (D) DEAA | 2.00 g |

As a result of measuring a viscosity (at 25° C.) of photopolymerizable composition 4 using a cone-plate (E type) viscometer, the viscosity was 31 mPa·s.

Example 5

Photopolymerizable composition 5 was prepared in a manner similar to Example 1 except that A-GLY-9E and LIGHT ACRYLATE 4EG-A (trade name, Kyoeisha Chemical Co., Ltd., hereinafter, abbreviated as 4EG-A) were used as water-soluble radically polymerizable compound (A) and a formulation ratio described below was applied.

| (A) A-GLY-9E | 4.00 g |
| (A) 4EG-A | 4.00 g |
| (B) TPO | 0.40 g |
| (C) G-15 | 0.084 g |

As a result of measuring a viscosity (at 25° C.) of photopolymerizable composition 5 using a cone-plate (E type) viscometer, the viscosity was 46 mPa·s.

Example 6

Photopolymerizable composition 6 was prepared in a manner similar to Example 1 except that A-GLY-9E and LIGHT ACRYLATE 9EG-A (trade name, Kyoeisha Chemical Co., Ltd., hereinafter, abbreviated as 9EG-A) were used as water-soluble radically polymerizable compound (A) and a formulation ratio described below was applied.

| (A) A-GLY-9E | 4.00 g |
| (A) 9EG-A | 4.00 g |
| (B) TPO | 0.40 g |
| (C) G-15 | 0.084 g |

As a result of measuring a viscosity (at 25° C.) of photopolymerizable composition 6 using a cone-plate (E type) viscometer, the viscosity was 79 mPa·s.

Example 7

Photopolymerizable composition 7 was prepared in a manner similar to Example 1 except that A-GLY-9E and LIGHT ACRYLATE 14EG-A (trade name, Kyoeisha Chemical Co., Ltd., hereinafter, abbreviated as 14EG-A) were used as water-soluble radically polymerizable compound (A) and a formulation ratio described below was applied.

| (A) A-GLY-9E | 4.00 g |
| (A) 14EG-A | 4.00 g |
| (B) TPO | 0.40 g |
| (C) G-15 | 0.084 g |

As a result of measuring a viscosity (at 25° C.) of photopolymerizable composition 7 using a cone-plate (E type) viscometer, the viscosity was 107 mPa·s.

Example 8

Photopolymerizable composition 8 was prepared in a manner similar to Example 1 except that A-GLY-9E and BLEMMER DA-800AU (trade name, NOF Corporation, hereinafter, abbreviated as DA-800AU) were used as water-soluble radically polymerizable compound (A) and a formulation ratio described below was applied.

| (A) A-GLY-9E | 6.00 g |
| (A) DA-800AU | 2.00 g |
| (B) TPO | 0.40 g |
| (C) G-15 | 0.084 g |

As a result of measuring a viscosity (at 25° C.) of photopolymerizable composition 8 using a cone-plate (E type) viscometer, the viscosity was 184 mPa·s.

Example 9

Photopolymerizable composition 9 was prepared in a manner similar to Example 1 except that DA-800AU was as water-soluble radically polymerizable compound (A), and 4HBA was used as water-soluble radically polymerizable compound (D), and a composition ratio described below was applied.

| (A) DA-800AU | 5.00 g |
| (B) TPO | 0.40 g |
| (C) G-15 | 0.084 g |
| (D) 4HBA | 3.00 g |

As a result of measuring a viscosity (at 25° C.) of photopolymerizable composition 9 using a cone-plate (E type) viscometer, the viscosity was 170 mPa·s.

Example 10

Photopolymerizable composition 10 was prepared in a manner similar to Example 9 except that DEAA was used as water-soluble radically polymerizable compound (D), and a composition ratio described below was applied.

| (D) DEAA | 2.00 g |
| (A) DA-800AU | 6.00 g |
| (B) TPO | 0.40 g |
| (C) G-15 | 0.084 g |

As a result of measuring a viscosity (at 25° C.) of photopolymerizable composition 10 using a cone-plate (E type) viscometer, the viscosity was 203 mPa·s.

Example 11

Photopolymerizable composition 11 was prepared in a manner similar to Example 1 except that 4EG-A and DA-800AU were as water-soluble radically polymerizable compound (A) and a formulation ratio described below was applied.

| (A) 4EG-A | 4.00 g |
| (A) DA-800AU | 4.00 g |
| (B) TPO | 0.40 g |
| (C) G-15 | 0.084 g |

As a result of measuring a viscosity (at 25° C.) of photopolymerizable composition 11 using a cone-plate (E type) viscometer, the viscosity was 176 mPa·s.

Example 12

Photopolymerizable composition 12 was prepared in a manner similar to Example 1 except that IRGACURE 379EG (trade name, BASF Japan Ltd., hereinafter, abbreviated as Irg 379) being 2-(dimethylamino)-2-[(4-methylphenyl)methyl]-1-[4-(4-morpholinyl)phenyl]-1-butanone was used as photopolymerization initiator (B) that generates radicals by irradiation with light rays, and a formulation ratio described below was applied.

| (A) A-GLY-9E | 8.00 g |
| (B) Irg 379 | 0.40 g |
| (C) G-15 | 0.084 g |

As a result of measuring a viscosity (at 25° C.) of photopolymerizable composition 12 using a cone-plate (E type) viscometer, the viscosity was 123 mPa·s.

Example 13

Photopolymerizable composition 13 was prepared in a manner similar to Example 1 except that LATEMUL E-118B (trade name, Kao Corporation, hereinafter, abbreviated as E-118B) being polyoxyethylene alkyl ether sodium sulfate was used as ionic surfactant (C), and a formulation ratio described below was applied.

| (A) A-GLY-9E | 8.00 g |
| (B) Irg 379 | 0.40 g |
| (C) E-118B | 0.084 g |

As a result of measuring a viscosity (at 25° C.) of photopolymerizable composition 13 using a cone-plate (E type) viscometer, the viscosity was 123 mPa·s.

Comparative Example 1

Photopolymerizable composition 14 was prepared in a manner similar to Example 1 except that ARONIX M-309 (non-water-soluble radically polymerizable compound; made by Toagosei Co., Ltd., hereinafter, abbreviated as M-309) being trimethylolpropane triacrylate was used in place of compound (A), and a formulation ratio described below was applied.

| (B) TPO | 0.40 g |
| (C) G-15 | 0.084 g |
| (Other) M-309 | 8.00 g |

As a result of measuring a viscosity (at 25° C.) of photopolymerizable composition 14 using a cone-plate (E type) viscometer, the viscosity was 109 mPa·s.

Comparative Example 2

Photopolymerizable composition 15 was prepared in a manner similar to Example 1 except that ARONIX M-305 (non-water-soluble radically polymerizable compound; made by Toagosei Co., Ltd., hereinafter, abbreviated as M-305) being pentaerythritol triacrylate was used in place of compound (A), and a formulation ratio described above was applied.

| (B) TPO | 0.40 g |
| (C) G-15 | 0.084 g |
| (Other) M-305 | 8.00 g |

As a result of measuring a viscosity (at 25° C.) of photopolymerizable composition 15 using a cone-plate (E type) viscometer, the viscosity was 647 mPa·s.

Comparative Example 3

Photopolymerizable composition 16 was prepared in a manner similar to Example 3 except that M-305 was used in place of compound (A), and a formulation ratio described above was applied.

| (B) TPO | 0.40 g |
| (C) G-15 | 0.084 g |
| (D) 4HBA | 3.00 g |
| (Other) M-305 | 5.00 g |

As a result of measuring a viscosity (at 25° C.) of photopolymerizable composition 16 using a cone-plate (E type) viscometer, the viscosity was 52 mPa·s.

Comparative Example 4

Photopolymerizable composition 17 was prepared in a manner similar to Example 4 except that M-305 was used in place of compound (A), and a formulation ratio described above was applied.

| | | |
|---|---|---|
| (B) TPO | 0.40 g | |
| (C) G-15 | 0.084 g | |
| (D) DEAA | 3.00 g | |
| (Other) M-305 | 5.00 g | |

As a result of measuring a viscosity (at 25° C.) of photopolymerizable composition 17 using a cone-plate (E type) viscometer, the viscosity was 70 mPa·s.

Comparative Example 5

Photopolymerizable composition 18 was prepared in a manner similar to Example 1 except that IRGACURE 2959 (photopolymerization initiator that generates no radical by irradiation with light rays having a wavelength of 400 nanometers or more; made by BASF Japan Ltd., hereinafter, abbreviated as Irg 2959) being 1-[4-(2-hydroxyethoxy)-phenyl]-2-hydroxy-2-methyl-1-propanone was used in place of compound (B), and a formulation ratio described below was applied.

| | | |
|---|---|---|
| (A) A-GLY-9E | 8.00 g | |
| (C) G-15 | 0.084 g | |
| (Other) Irg 2959 | 0.40 g | |

As a result of measuring a viscosity (at 25° C.) of photopolymerizable composition 18 using a cone-plate (E type) viscometer, the viscosity was 115 mPa·s.

Comparative Example 6

Photopolymerizable composition 19 was prepared in a manner similar to Example 1 except that compound (C) was not used and a formulation ratio described below was applied.

| | | |
|---|---|---|
| (A) A-GLY-9E | 8.00 g | |
| (B) TPO | 0.40 g | |

As a result of measuring a viscosity (at 25° C.) of photopolymerizable composition 19 using a cone-plate (E type) viscometer, the viscosity was 118 mPa·s.

Comparative Example 7

Photopolymerizable composition 20 was prepared in a manner similar to Example 1 except that MEGAFACE F477 (made by DIC Corporation, hereinafter, abbreviated as F477) being a nonionic surfactant was used in place of compound (C), and a formulation ratio described below was applied.

| | | |
|---|---|---|
| (A) A-GLY-9E | 8.00 g | |
| (B) TPO | 0.40 g | |
| (Other) F477 | 0.084 g | |

However, photopolymerizable composition 20 became cloudy, and therefore no evaluation thereafter was performed.

Evaluation of Photopolymerizable Composition and Cured Film

The photopolymerizable composition obtained as described above may be occasionally referred to as ink below.

Photocurability and water washability of ink, and peelability of a cured object from a PTFE sheet, the cured object being obtained from the ink obtained as described above, and water resistance of the cured object were evaluated. Results obtained are shown in Table 1 and Table 2.

Ink Compatibility

Ink was adjusted, and then whether or not each component of the ink was properly dissolved with each other was visually observed. An evaluation criterion is as described below.

Good: Ink is transparent.
Bad: Ink is cloudy.

Photocurability

Glass substrates 4 centimeter square were arranged, and 0.05 g of ink 1 to 20 were dropped on the glass substrate using a Pasteur pipette, and another glass substrate was placed thereon. Then, an h-line pass-filter was placed thereon, and then the resulting assembly was irradiated with an h-line having an intensity of 500 mJ/cm$^2$ using an UV irradiation unit (TME-400PRC, made by TOPCON Corporation). In addition, an integrated exposure amount was measured by UV Intensity Meter UIT-201 attached with detector UVD-405PD made by USHIO Inc.

After irradiation with the h-line, one of the glass substrates placed thereon was peeled, and a surface state of a cured film upon contact with a finger was observed through a microscope. An evaluation criterion is as described below.

◯: No contact-finger mark remains on a cured film surface.

Δ: A contact-finger mark slightly remains on a cured film surface.

X: A contact-finger mark completely remains on a cured film surface.

Water Washability

Ink 1 to 20 were dropped on a glass substrate on which a cured film was formed as obtained upon evaluating photocurability. Then, a surface state of the cured film after the ink was washed away using deionized water was observed through a microscope. An evaluation criterion is as described below.

◉: Ink on a cured film surface can be completely washed away within 10 seconds.

◯: Ink on a cured film surface can be completely washed away within 1 minute.

Δ: Ink partially remains on a cured film surface even after the ink is washed with water for 1 minute or more.

X: Ink completely remains on a cured film surface even after the ink is washed with water for 1 minute or more.

Peelability of Cured Object from PTFE Sheet

On a glass substrate on which PTFE is placed, 0.05 g of ink 1 to 17 was dropped, and the resulting material was stored in a replacement box for a UV curing unit subjected to nitrogen replacement. Then, an h-line pass-filter was placed thereon, and the resulting material was irradiated with an h-line having an intensity of 500 mJ/cm$^2$ using an UV irradiation unit (TME-400PRC, made by TOPCON Corporation). In addition, an integrated exposure amount was measured by UV Intensity Meter UIT-201 attached with detector UVD-405PD made by USHIO Inc.

In addition, after irradiation with the h-line, with regard to a cured object formed on the PTFE, for example, a cured object obtained from ink 1 is referred to as cured object 1. Cured objects 1 to 20 were anchored with tweezers, and peeling resistance from a PTFE sheet was examined. An evaluation criterion is as described below.

⊚: A cured object is peeled even if almost no force was applied.
○: A cured object is peeled if force at a degree of no scratch on the cured object is applied.
X: A cured object is not peeled even when force is applied.

Water Resistance

A cured object obtained in evaluation of peelability of the cured object from a PTFE sheet was immersed into deionized water for a predetermined period of time, and a change in color of the cured object was observed. An evaluation criterion is as described below.

⊚: No change is caused even after 24 hours.
○: No change is caused after 12 hours, but somewhat whiteness is caused after 24 hours.
○Δ: No change is caused after 6 hours, but somewhat whiteness is caused after 12 hours.
Δ: No change is caused after 1 hour, but somewhat whiteness is caused after 6 hours.
X: Whiteness is caused within 1 hour.

Among the objects, in particular, peelability of cured objects 1 to 12 from the PTFE was further satisfactory, and water washability of cured objects (1 to 11) was further satisfactory.

Moreover, in water resistance, cured objects 5, 6 and 8 were particularly satisfactory, and subsequently cured objects 1, 3, 4, 7 and 11 were satisfactory, and subsequently, cured objects 2, 9 and 10 were satisfactory.

INDUSTRIAL APPLICABILITY

As described above, according to the invention, ink of the invention is excellent in ink compatibility and photocurability, and also excellent in peelability, from a PTFE sheet, of a cured object obtained from the ink of the invention and water resistance.

Accordingly, from the ink of the invention, a cured object can be obtained, in which the cured object is prepared by using light rays having a wavelength of 400 nanometers or more to allow photocure, fabrication equipment water after use is washed with water to allow easy removal of the cured object from a support.

Therefore, the ink of the invention can be preferably used in order to manufacture a 3D fabricated object manufactured by a lamination fabrication method.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Ink | 1 | 2 | 3 | 4 | 5 | 6 | 7 | 8 | 9 | 10 | 11 | 12 | 13 |
| Cured object | 1 | 2 | 3 | 4 | 5 | 6 | 7 | 8 | 9 | 10 | 11 | 12 | 13 |
| Ink viscosity [mPa·s] | 97 | 213 | 28 | 31 | 46 | 46 | 46 | 46 | 46 | 203 | 176 | 123 | 123 |
| Ink compatibility | ○ | ○ | ○ | ○ | ○ | ○ | ○ | ○ | ○ | ○ | ○ | ○ | ○ |
| Photocurability | ○ | ○ | ○ | ○ | ○ | ○ | ○ | ○ | ○ | ○ | ○ | ○ | ○ |
| Peelability from PTFE | ⊚ | ⊚ | ⊚ | ⊚ | ⊚ | ⊚ | ⊚ | ⊚ | ⊚ | ⊚ | ⊚ | ⊚ | ○ |
| Water washability | ⊚ | ⊚ | ⊚ | ⊚ | ⊚ | ⊚ | ⊚ | ⊚ | ⊚ | ⊚ | ⊚ | ○ | ○ |
| Water resistance | ○ | ○Δ | ○ | ○ | ⊚ | ⊚ | ○ | ⊚ | ○Δ | ○Δ | ○ | ○ | ○ |

TABLE 2

| | Comparative Example | | | | | | |
|---|---|---|---|---|---|---|---|
| | 1 | 2 | 3 | 4 | 5 | 6 | 7 |
| Ink | 14 | 15 | 16 | 17 | 18 | 19 | 20 |
| Cured object | 14 | 15 | 16 | 17 | 18 | 19 | 20 |
| Ink viscosity [mPa·s] | 109 | 647 | 52 | 70 | 115 | 118 | *1 |
| Ink compatibility | ○ | ○ | ○ | ○ | ○ | ○ | X |
| Photocurability | ○ | ○ | ○ | ○ | X | ○ | *3 |
| Water washability | X | X | X | X | *1 | ○ | *3 |
| Peelability from PTFE | ⊚ | ⊚ | ⊚ | ⊚ | *1 | X | *3 |
| Water resistance | ○ | ○ | ○ | ○ | *1 | *2 | *3 |

*1: Not evaluated because photocurability of ink decreased.
*2: Not evaluated because peelability from PTFE decreased.
*3: Not evaluated because ink suspended.

As is obvious from the results shown in Table 1, ink 1 to 13 were satisfactory in ink compatibility and photocure, and peelability from PTFE and water washability of cured objects 1 to 13.

What is claimed is:

1. A photopolymerizable composition for stereolithography, containing water-soluble radically polymerizable compound (A) represented by formula (1), photopolymerization initiator (B) that generates radicals by irradiation with light rays having a wavelength of 400 nanometers or more, and ionic surfactant (C):

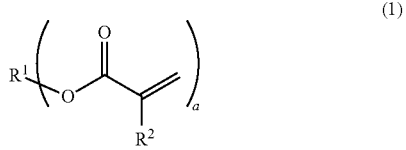

(1)

wherein, in formula (1), $R^1$ is an a-valent organic group, a is an integer of 2 or more, and $R^2$ is hydrogen or alkyl having 1 to 6 carbons, and the photopolymerizable composition can be washed out with water, but a fabricated object obtained from the photopolymerizable composition has water resistance.

2. The photopolymerizable composition according to claim 1, wherein $R^1$ of radically polymerizable compound (A) includes a compound having structure represented by formula (2):

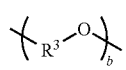
(2)

wherein, in formula (2), $R^3$ is alkylene having 2 to 5 carbons, and b is an integer of 1 or more.

3. The photopolymerizable composition according to claim 1, wherein photopolymerization initiator (B) is one or more selected from the group of an α-aminoalkylphenon-based compound and an acylphosphine oxide-based compound.

4. The photopolymerizable composition according to claim 1, wherein photopolymerization initiator (B) is one or more selected from an acylphosphine oxide-based compound.

5. The photopolymerizable composition according to claim 1, wherein ionic surfactant (C) is one or more selected from the group of alkylbenzene sulfonate and polyoxyethylene alkyl ether sulfuric ester salt.

6. The photopolymerizable composition according to claim 1, wherein ionic surfactant (C) is alkylbenzene sulfonate.

7. The photopolymerizable composition according to claim 1, further containing water-soluble radically polymerizable compound (D) having structure represented by formula (3), (4) or (5):

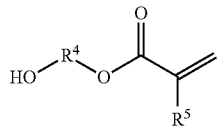
(3)

wherein, in formula (3), $R^4$ is a divalent organic group, and $R^5$ is hydrogen or alkyl having 1 to 6 carbons:

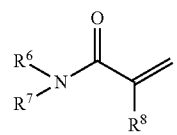
(4)

wherein, in formula (4), $R^6$ is hydrogen or a monovalent organic group, $R^7$ is a monovalent organic group, and $R^8$ is hydrogen or alkyl having 1 to 6 carbons:

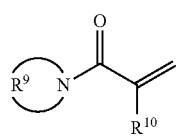
(5)

wherein, in formula (5), $R^9$ is a divalent organic group, and $R^{10}$ is hydrogen or alkyl having 1 to 6 carbons.

8. A photofabricated object obtained by curing the photopolymerizable composition according to claim 1.

* * * * *